Sept. 14, 1926.  L. G. HUNTINGTON  1,599,893
WOODWORKING MACHINE
Filed Feb. 28, 1925   5 Sheets-Sheet 1

Inventor
Lloyd G. Huntington.
By
Attorney.

Sept. 14, 1926.

L. G. HUNTINGTON 1,599,893

WOODWORKING MACHINE

Filed Feb. 28, 1925    5 Sheets-Sheet 3

Inventor
Lloyd G. Huntington

By Horace C. Chandler

Attorney

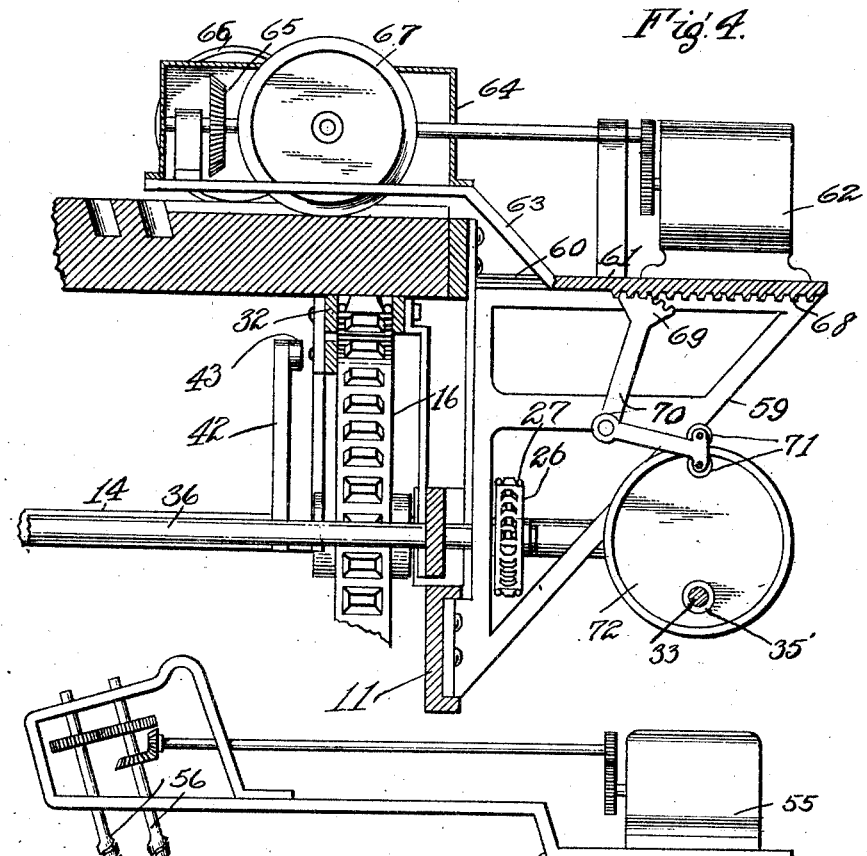
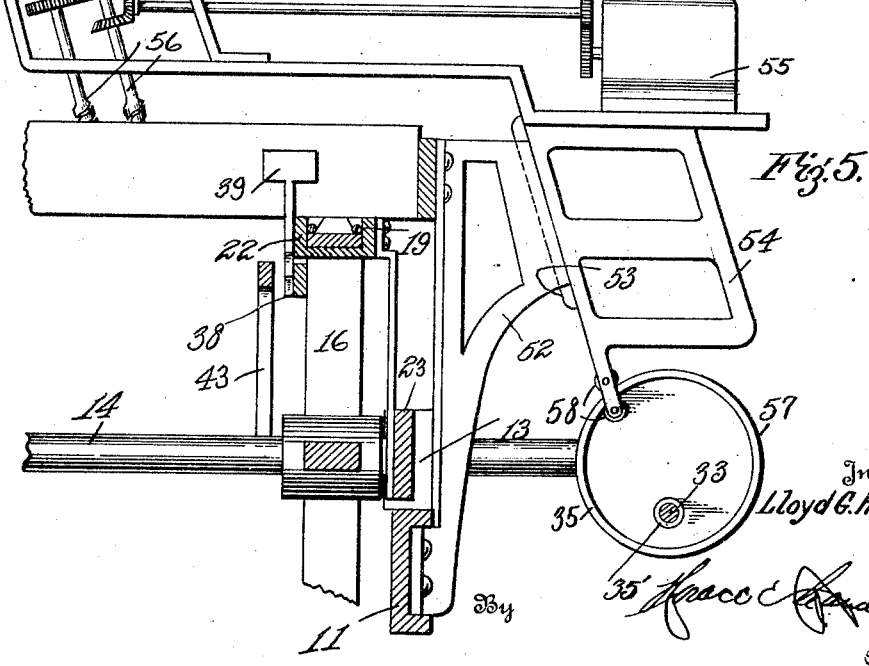

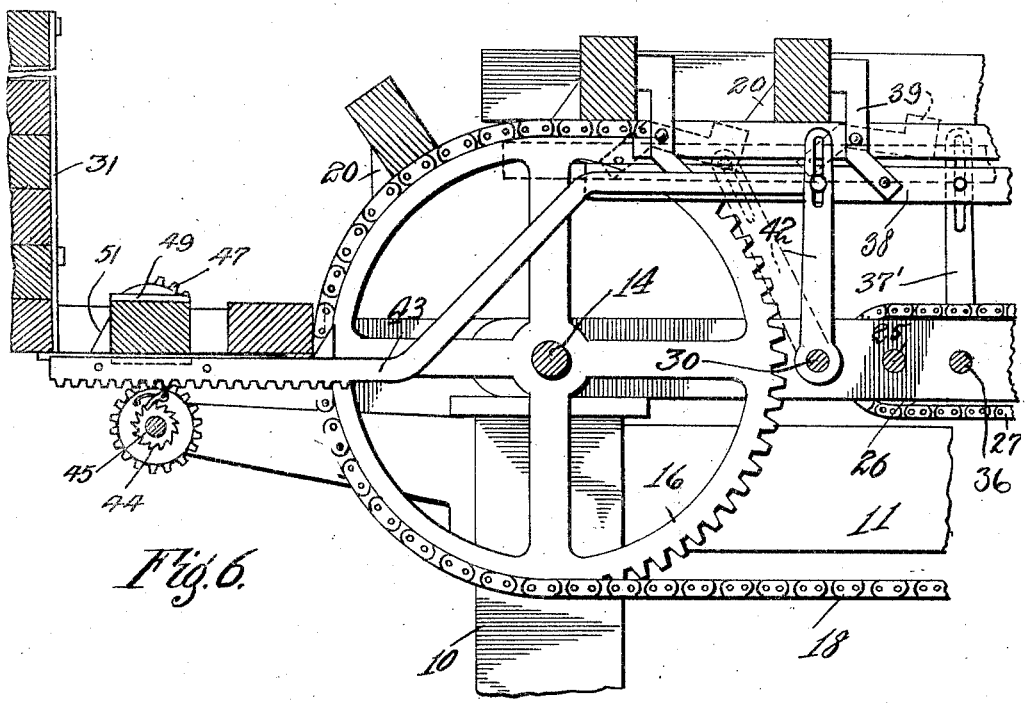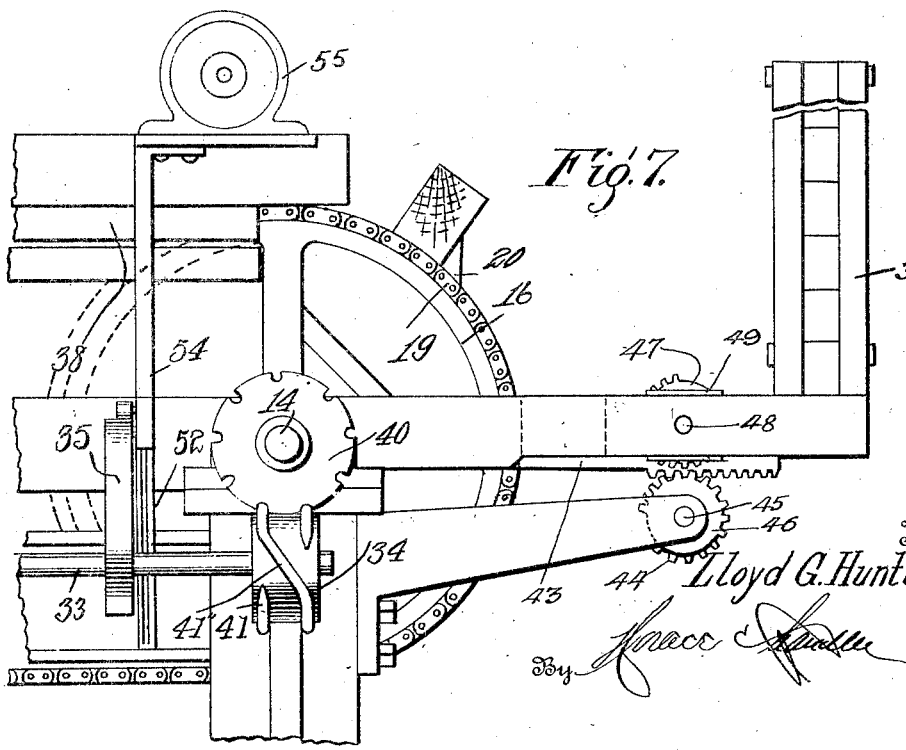

Patented Sept. 14, 1926.

1,599,893

UNITED STATES PATENT OFFICE.

LLOYD G. HUNTINGTON, OF DUBUQUE, IOWA.

WOODWORKING MACHINE.

Application filed February 28, 1925. Serial No. 12,454.

This invention relates to new and useful improvements in woodworking machines, and particularly to machines for treating sash stiles.

One object of the invention is to provide a machine by means of which a plurality of stiles may be simultaneously bored and plowed, to permit the attachment of the sash cords and to permit free passage of the sash cord pulley of the window frame.

Another object is to provide a machine of this character wherein the stiles are fed from a hopper, singly, to an endless carrier for presentation to boring and plowing means, and by means of which every alternate stile is turned over as it passes from the hopper to the carrier, to provide for boring and plowing on the corresponding edge faces thereof.

Another object is to provide a machine of this character wherein an endless carrier is intermittently moved forwardly a predetermined distance to position a number of styles before the boring and plowing means, simultaneously, and then to stop the carrier in such position, at which time the boring and plowing means are advanced to the stiles for action thereupon, the boring and plowing means being subsequently withdrawn after completing their work, and the carrier moved to position the stiles before the boring and plowing means in a different order.

Other objects and advantages will be apparent from the following description when taken in connection with the accompanying drawings.

In the drawings:

Figure 4 is a vertical transverse sectional view on the line 4—4 of Figure 2.

Figure 5 is a vertical transverse sectional view on the line 5—5 of Figure 2.

Figure 6 is an enlarged vertical longitudinal section on the line 6—6 of Figure 2.

Figure 7 is a side elevation of the hopper end of the machine viewed from the side opposite to that of Figure 1.

Figure 1:
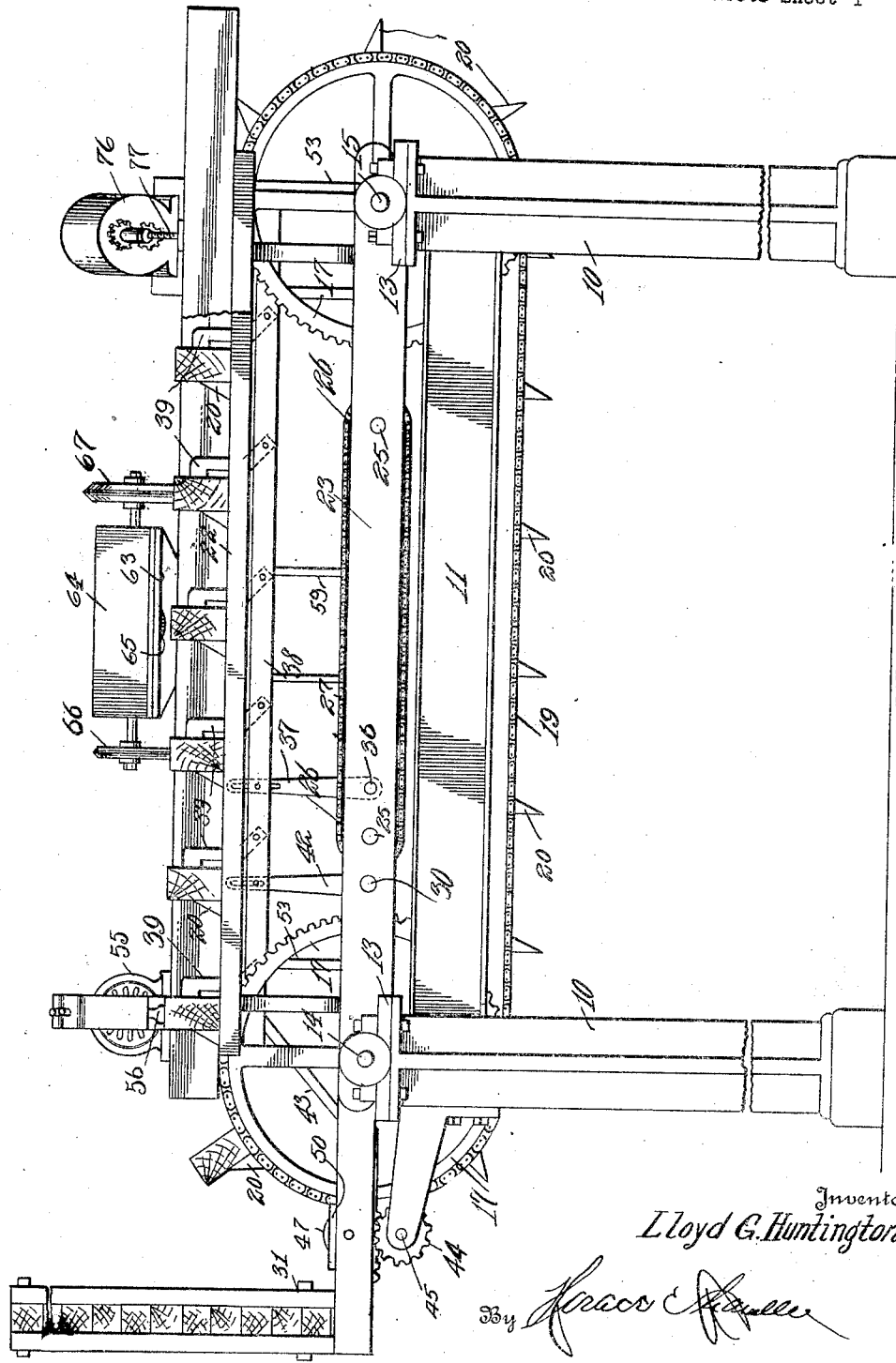
Figure 1 is a side elevation of a stile working machine made in accordance with the present invention.
Figure 2:
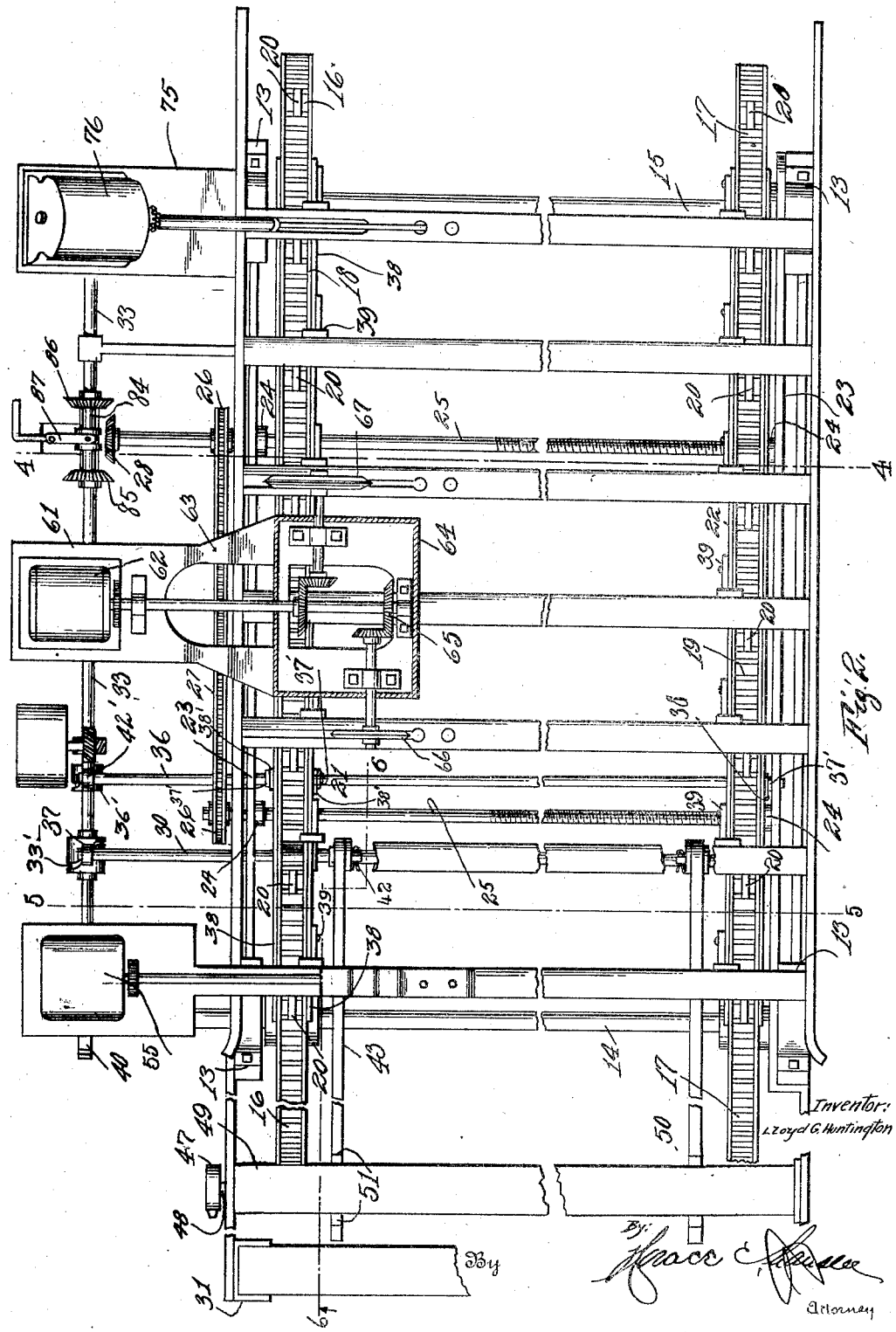
Figure 2 is a top plan view of the same.
Figure 3:
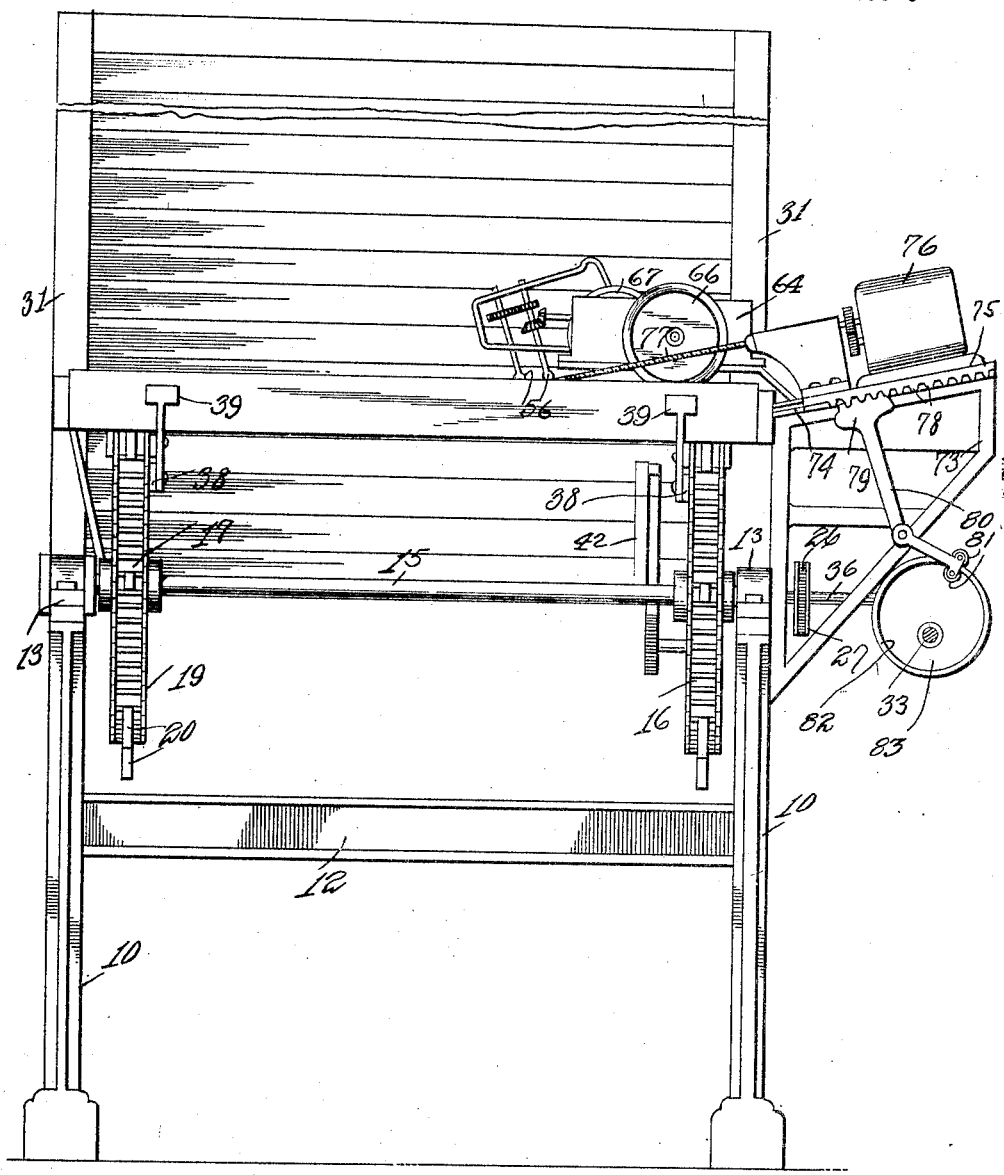
Figure 3 is an end elevation of the machine, viewed from the discharge end thereof.
Figure 8:
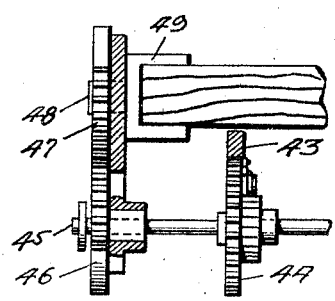
Figure 8 is a fragmentary elevation of the stile reversing means, viewed from the end of the machine.

Referring particularly to the accompanying drawings, there is shown a supporting frame or table which includes the legs 10, and the upper horizontal frame which comprises the longer side bars 11 and the transverse bars 12. Mounted on the ends of the members 11 are the bearings 13 in which are rotatably supported the ends of the two transverse shafts 14 and 15, and mounted on these shafts, at the ends thereof, are the sprocket wheels 16 and 17, the former being disposed at one side of the table, while the latter are disposed at the other side thereof. Engaged around these sprockets are the chains 18 and 19, respectively, each of said chains carrying the conveyor lugs or flights 20, and each of the chains running through the channel members 21, 22, the former of which is fixed on the supporting frame, while the latter is adjustable toward and away from the former, as will be explained later herein. The sprocket wheels 17, and the channel 22 are supported by a yoke 23, and formed in the lower portion of this yoke are the internally threaded bosses 24, through which are engaged the threaded adjusting rods 25. The sprockets 17 are splined on the shafts 14 and 15, whereby they are permitted to slide longitudinally thereon, when the yoke is adjusted, and at the same time maintain their driving connection with said shafts. On corresponding ends of the threaded rods 25 there are fixed the sprocket wheels 26, and engaged around these sprocket wheels is the chain 27, whereby said rods will rotate in unison. On one of the rods 25, outwardly of the sprocket wheel 26, there is mounted a bevel gear 28, to which reference will be made later herein. Extending transversely of the supporting frame of the machine, and suitably supported in the sides thereof, is a shaft 30. On this shaft 30 are fixed the radial arms 37 and 42, the former of which engages a cam 33', on the shaft 33, while the latter are connected with the bars 43. At one end of the table is mounted a hopper 31, into which are placed the sash stiles to be treated in the machine, and which are delivered, one at a time, to the chains 18 and 19, and in front of the lugs 20, so that as the chains move forwardly the stiles will be carried thereby, to the other end of the table, and discharged therefrom.

In view of the fact that the stiles must be treated in pairs, it is necessary to treat one edge face of one stile, and the reverse face of the next stile, whereby to produce a pair of stiles for a single sash.

Extending longitudinally of the table, at one side thereof, and mounted in suitable bearings 32, is a shaft 33, and fixed on this shaft are the cams 34 and 35. Properly supported on the table, and extending transversely thereof, in parallel relation to the rods 25, is a shaft 36, on which are secured the radial arms 37′ and 42′, the latter engaging cam 36′ and the former being connected with bars 38 by means of the links 38′. Near one side of each of the channels 21 and 22 is a longitudinally extending bar 38, and pivotally connected at their lower ends to these bars are the series of vertically disposed stop members 39, the upper ends of which are arranged above the channel members for engagement with the opposite side faces of the stiles, from those engaged by the lugs 20. The intermediate portions of the members 39 are pivotally mounted on the sides of the channel members 21 and 22, whereby, as the bars 38 are shifted longitudinally the stop members 39 will be rocked on their pivots into and out of engagement with the stiles. On one end of the shaft 14 there is fixed a toothed wheel 40, which engages with a peripheral rib formed on the cam wheel 34, said rib including the portions 41 which extend around the wheel in parallel relation, and the transverse oblique portion 41″ extending between and connected to the portions 41. When the oblique portion 41″ engages with the teeth of the wheel 40 said wheel will be rotated to turn the shaft 14, and thereby drive the chains to advance the stiles to the tools. When the portion 41 engages the wheel 40 said wheel remains idle, with the result that the chains 18 and 19 remain stationary for a sufficient period to permit action of the tools which will be later described, herein. The wheel 34 is in constant rotation, and at each revolution thereof the oblique portion of the rib will turn the wheel 40 to cause the chains 18 and 19 to advance a distance equal to the distance between an adjacent pair of lugs 20, which is also the distance between the tools which will be later described. Also secured to the shaft 30 is a radial arm 42, and pivotally connected with the outer end of the arm is one end of a rack bar 43, said bar being slidably supported adjacent the bottom of the hopper 31 and engaging with a pawl and ratchet pinion 44 loosely mounted on the short shaft carried by the side of the table, and shown at 45. On the other end of this shaft 45 there is secured intermittent gear 46 which meshes with intermittent gear 47 on a stub shaft 48 mounted above the shaft 45. On the other end of the stub shaft 48 there is secured the horizontal bifurcated member 49 which is arranged to receive one end of a stile, as the stile is moved out from the bottom of the hopper. On the opposite side of the table there is mounted a horizontal idle bifurcated member 50, which receives the other end of the stile. These members 49 and 50 are so arranged and operated that they may be intermittently disposed to receive the ends of a stile within their bifurcations. Pivotally mounted on the rack bar 43 are the vertically extending lugs 51, which swing down, as the bar moves rearwardly beneath the bottom of the hopper, and return to upright position to grip and pull a stile from the hopper, to dispose its ends in the bifurcated members 49 and 50, when said bar moves forwardly. When a stile is properly engaged in the bifurcated members 49 and 50 and the rack bar moves forwardly beneath the hopper, the shaft 45 remains stationary, but when the rack bar moves rearwardly the shaft is rotated and the bifurcated member 49 turned, through the medium of the gears 44, 46, and 47, to overturn or reverse the stile for presentation to the lugs 20 of the conveyor chains 18 and 19. The next stile is, however, passed through the bifurcated members 49 and 50 without rotary movement of said members. Thus every alternate stile is turned over, whereby to provide pairs of stiles which will properly fit a window sash, to form right and left members of the sash.

On the side of the table, above the cam shaft 33, there is mounted a bracket 52 which has the downwardly and outwardly extending slideways 53 which support the carrier 54. On the upper end of the carrier there is mounted an electric motor 55, for driving the pair of obliquely extending boring bits 56. Below this carrier is disposed the before-mentioned cam member 35, said member having a laterally extending peripheral flange 57 which engages between a pair of spaced rollers 58 carried by the lower end of the carrier. This wheel 35 is eccentrically mounted, at 35′, on the shaft 33, whereby, when the shaft and cam are rotated the carrier will be pushed upwardly and pulled downwardly in the slideways to advance the bits into working position with relation to a stile, and to withdraw the bits from the stile. The operations of moving the bits into the work, and then withdrawing same from the work take place during the interval when the portions 41 of the cam rib are in engagement with the wheel 40, and the chains 18 and 19 are stationary.

Adjacent the bracket 52 is a bracket 59, the upper portion of which is formed with a horizontal slideway 60 which slidably supported the platform 61 of the motor 62. Carried by the platform 61, and extending forwardly and horizontally therefrom, over the adjacent chain 18, is an arm 63, which supports a gear casing 64, containing gears 65 which are operatively connected with the motor shaft and with the plowing or grooving tools 66 and 67. These tools 66 and 67 are spaced a distance apart equal to the distance between the stiles on the chains 18 and 19, so that said tools can simultaneously operate upon two alternate stiles. One of the tools is adapted to plow a long, comparatively narrow groove in the edge face of the stile, while the other tool is adapted to plow a comparatively wide and shorter groove, which extends longitudinally from the inner end of the wider groove. The inner end of the narrow groove terminates in the adjacent of the openings which are bored by the bits 56. In the lower face of the platform 61 there is formed a series of rack teeth 68, which is engaged by the segmental gear 69 carried by the upper end of the bent lever 70 which is pivotally supported on the bracket 59, and has its lower end provided with spaced rollers 71 for straddling engagement with the peripheral flange of the cam or eccentric wheel 72 secured on the shaft 33. Thus, as the wheel 72 makes a complete revolution it actuates the segment 69 to cause the motor 62 and the tools 66 and 67 to be advanced along the face of the stile, and to be withdrawn from operative engagement therewith.

Also mounted on the side of the table, above the shaft 33, is a bracket 73 which has a downwardly and inwardly inclined slideway 74, in which is slidably supported the platform 75. On this platform is mounted the motor 76, which is operatively connected with the obliquely extending boring bit 77, said bit being arranged to bore an opening which connects the two openings bored by the bits 56, and through which the sash cord, not shown, is arranged to be passed, a knot being made on the end of the cord and seated in one of the pair of openings.

On the lower face of the platform 75 there is formed a toothed rack 78, which is engaged by the segment 79, on the centrally pivoted arm 80, which is mounted on the bracket 73. The lower end of the arm 80 is provided with a pair of rollers 81 which straddle the peripheral flange 82, of the eccentric or cam wheel 83, which is mounted on the shaft 33. Rocking of the arm 80 causes the platform to be moved forwardly and rearwardly to advance the bit 77 into working relation to the stile, and to withdraw same therefrom, after proper action upon the stile.

Splined on the shaft 33 is a sleeve 84, on the opposite ends of which are formed the bevel gears 85 and 86, suitable means 87 being provided for shifting this sleeve on the shaft to engage one or the other of the gears 85—86 with the gear 28, whereby to cause the rods 25 to be rotated in the desired direction for the purpose of moving the chain 19, and the mechanism associated therewith, toward and away from the chain 18, to accommodate stiles of different lengths.

From the foregoing it will be seen that there has been provided a machine wherein stiles are fed, singly, to an endless conveyor which carries the stiles into positions opposite a series of boring and plowing devices. Also, mechanism is provided which moves the conveyor in a step-by-step fashion, so that the stiles will be stopped and held in their positions opposite the tools, for a sufficient period of time to permit the tools to perform their work on the stiles. Thus, while one stile is being formed with two holes by the pair of bits 56, the stile which is two spaces ahead is being formed with a narrow groove, while the stile two spaces ahead of the last-named stile is being formed with a wider groove. The foremost stile is being formed with an oblique opening which connects the openings formed by the pair of bits 56. Thus the operations of boring and plowing are being performed simultaneously upon a plurality of stiles, and when the most advanced stile is discharged from the machine it is properly provided with grooves and openings for the reception and attachment of a sash cord.

Furthermore, every other one of the stiles, as it is automatically moved from the hopper, is overturned into a position to permit its other edge face to be acted upon by the tools, so that it forms a companion stile for either the one which precedes or follows it. Also, the pivoted stop arms 39 cooperate with the lugs 20 to hold the stiles while being acted upon by the tools, such stops being immediately released to permit the carrier to be advanced one space for the next operations.

What is claimed is:—

1. A sash stile working machine including a carrier for supporting a plurality of sash stiles, a shaft, cams on the shaft, one of the cams intermittently moving and stopping the carrier, boring and plowing means, certain of the cams operating to advance and withdraw the boring and plowing means, and intermittently operated stops for engagement with the individual stiles upon stopping of the carrier.

2. A sash stile working machine including a carrier for supporting a plurality of stiles, boring and plowing means, a shaft, a plurality of cams on the shaft, means for driving the shaft constantly, operative connections between one of the cams and the carrier whereby to intermittently move and stop said carrier to position certain of the stiles simultaneously for action of the boring and plowing means, disappearing stops for engagement with the stiles when the carrier is stopped, and means for advancing and withdrawing the boring and plowing means operatively engaged with certain others of said cams.

3. A sash stile working machine including a carrier, a hopper containing stiles to be worked and arranged to be fed to the carrier, boring and plowing means adjacent the carrier, means for intermittently advancing and stopping the carrier to simultaneously position different stiles for action of the boring and plowing means, means for automatically delivering the stiles singly from the hopper to the carrier, and means for overturning every alternate stile as it is delivered from the hopper.

4. A sash stile working machine including a carrier, a hopper containing stiles to be worked and arranged to be fed to the carrier, treating means adjacent the carrier, means for intermittently stopping the carrier to simultaneously dispose the work to the treating means, means for overturning every alternate stile as it is moved from the hopper, and means for placing a stile in the overturning means and for placing a stile in position for engagement by the carrier.

5. A sash stile working machine including a carrier, a hopper containing stiles to be worked and arranged to be fed to the carrier, treating means opposite the carrier, means between the hopper and the carrier for overturning every alternate stile as the stile is withdrawn from one hopper, means for intermittently stopping the carrier, means for simultaneously placing a stile in the overturning means and placing a stile on the carrier, and means actuated upon stopping of the carrier for operating said placing means.

6. A sash stile working machine including a carrier, a hopper containing stiles to be worked and arranged to be fed to the carrier, treating means adjacent the carrier, means between the hopper and carrier for overturning a stile, means for intermittently stopping the carrier, means for simultaneously withdrawing a stile from the hopper and placing same in the overturning means and placing a stile on the carrier, upon movement in one direction, and for actuating the overturning means upon movement in the opposite direction, and means operated synchronously with the carrier stopping means for operating said placing means.

7. A sash stile working machine including a carrier, a hopper containing stiles to be worked and arranged to be fed to the carrier, means between the hopper and carrier for overturning every alternate stile and through which all of the stiles pass from the hopper to the carrier, means for intermittently stopping the carrier, means reciprocable beneath the overturning means and hopper for simultaneously placing a stile in the overturning means and placing another stile on the carrier, and means actuated by the stopping means for moving said reciprocable means.

8. A sash stile working machine including a carrier, a hopper containing stiles to be worked and arranged to be fed to the carrier, means between the hopper and carrier for overturning every alternate stile as it is moved from the hopper, reciprocable means movable in one direction to actuate the overturning means, and movable in the opposite direction to simultaneously place a stile in the overturning means and to place a stile on the carrier, and means for intermittently actuating the reciprocable means.

In testimony whereof, I affix my signature.

LLOYD G. HUNTINGTON.